Patented Feb. 4, 1936

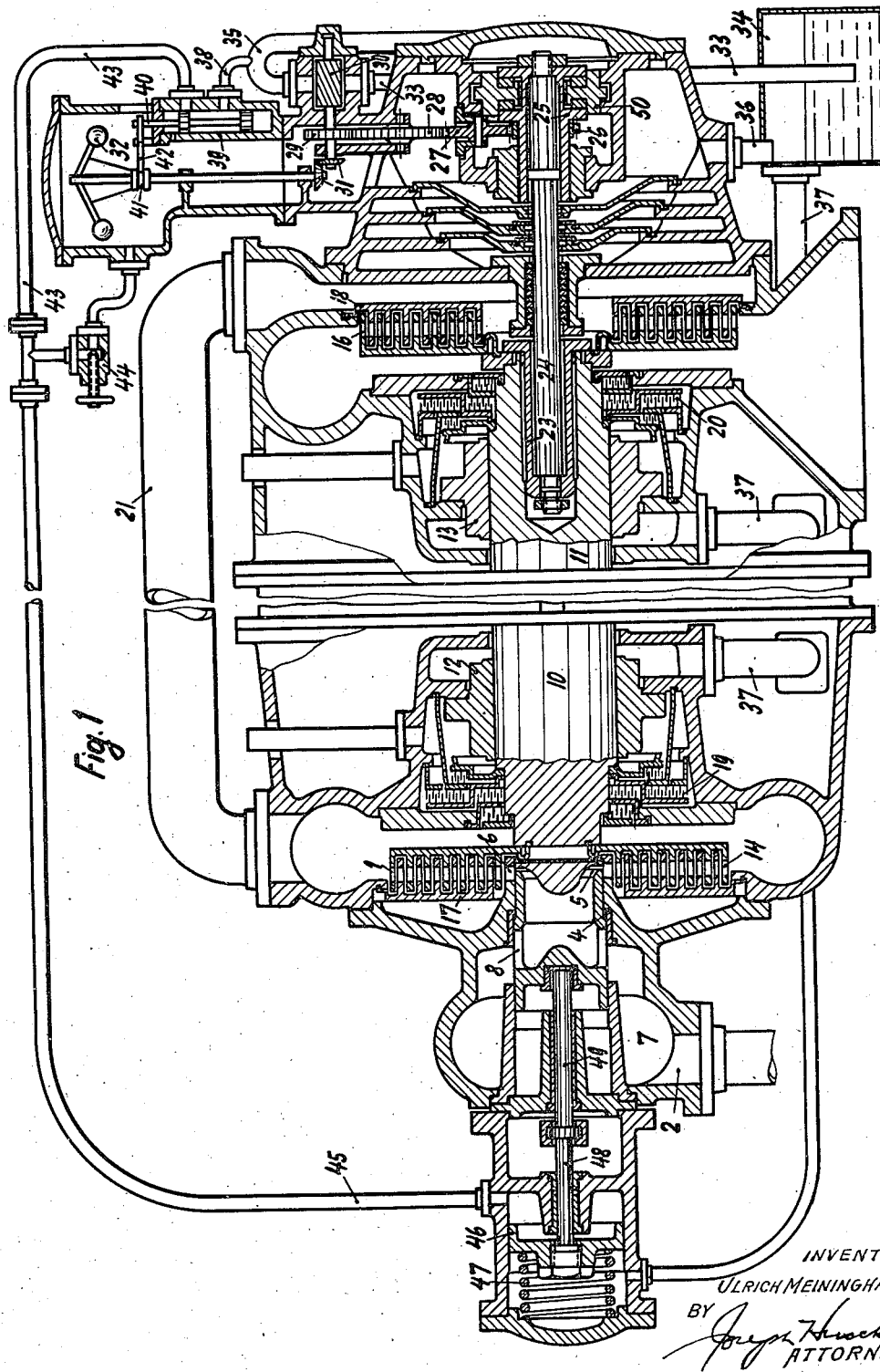

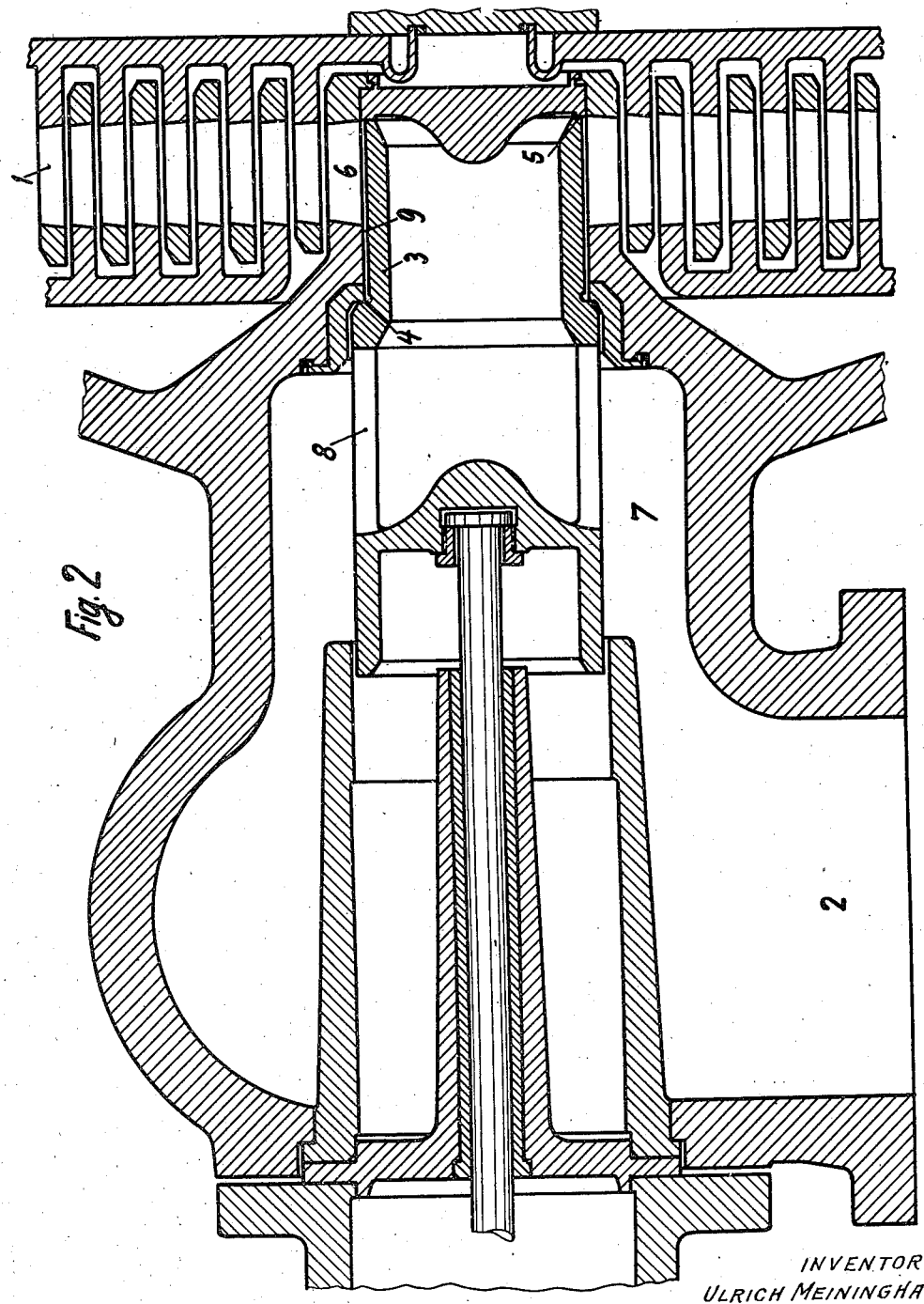

2,029,331

UNITED STATES PATENT OFFICE 2,029,331

APPARATUS FOR REGULATING TURBO-MACHINES

Ulrich Meininghaus, Mulheim-Ruhr, Germany

Application May 17, 1933, Serial No. 671,441
In Germany June 1, 1932

10 Claims. (Cl. 253—87)

My invention relates to the regulation of the speed or the power output of turbomachines which are impinged by an elastic fluid, as for instance steam or gas turbines. The object of the invention is to provide an efficient and yet simple method and apparatus for effecting such regulation by changing the number of pressure drops throughout the turbomachine.

Economical turbines work, as is known, principally with multiple pressure drop as distinct from pure velocity staging. The simplest form of performance regulation of such turbines is the so called throttle regulation. By this regulation the pressure of the driving medium is throttled down in order to diminish the performance by diminishing a throttle cross-section disposed in front of the turbine. The driving medium then fills the blade channels of the turbine which effect the pressure drop with diminished quantity of flow in consequence of the increased specific volume due to the expansion when the pressure is diminished. By this regulation process high speeds of the driving medium occur in the throttle cross-section in consequence of the pressure difference to be throttled down. The energy embodied in the driving medium at these speeds is almost entirely nullified in practice by eddy formation in the comparatively long path to the blading or transformed into energy forms of low value in which it can only be used up to a very small percentage for developing power. Besides the diminution of the quantity of driving medium passing through the turbine, there also occurs simultaneously an uneconomical reduction in the working head of the driving medium.

In order to avoid the loss of economy which is entailed by the reduction in working head, it was early proposed to construct at least the first turbine stage as an action stage and to obtain regulation of performance by suitably shutting off the nozzles belonging to this action stage. For example, the nozzles would be closed consecutively by an unrolling steel band. It was found, however, technically impossible to construct this arrangement so as to be reliable in operation.

In practice, therefore, an intermediate solution has been adopted in that the nozzles of the first action stage were divided into separate groups (generally four) so that several regulating points of good efficiency were created. The group of nozzles is adjusted to the desired performance by the above described regulation so that between the regulation points of good efficiency the efficiency decreases in correspondence with the throttling down of the regulated groups of nozzles.

The invention aims at combining the advantages of both types of regulation without including their disadvantages. It is, therefore, proposed according to the invention to effect a gradual transition from the stepwise pressure drop occurring at full load, which is known to be necessary in order to attain good efficiency, to a partly pure velocity staging, (Curtis blading) in that the number of pressure drops in consecutive stages is reduced by diminishing the throttle cross-section controlling the through-put of driving medium. Special advantages result when the process for regulating the through-put of driving medium serves for the high pressure blades of a rotary machine with radial admission whose blade carriers are distributed on both shaft ends of another rotary machine in order to obtain equalization of thrust. If purely throttle regulation of the kind heretofore usual were employed to regulate such rotary machine experience shows that in many cases the axial thrust on the low pressure side would diminish with increasing throttling more rapidly than the axial thrust on the high pressure side. This often gives rise to a considerable difference between the two thrusts which loads the thrust bearing to a non-permissible extent. By applying the method of regulation according to the invention to the high pressure portion, pure velocity traversal sets in in a number of high pressure stages which increases with increasing throttling of the driving medium whereby the pressure drop within these blades disappears and the axial thrust of the high pressure portion diminishes correspondingly, i. e. follows more closely the changes in axial thrust of the low pressure portion. If the performance of the turbine is diminished by the method according to the invention the driving medium after flowing through the guide channels controlling the direction traverses the first row of rotating blades with a speed approximating to that produced in the regulating throttle cross-section. At full load on the other hand every loss in the regulating throttle cross-section disappears whereby this cross-section is open so wide that the whole blading works with pressure drop in every stage.

The devices for carrying out the method of regulation according to the invention are characterized principally by the fact that the first row of guide blades of the blading is closely adjacent throughout its entire periphery to the regulating throttle cross-section. When applied to radially traversed turbines the throttle cross-section of the regulating member is advantageously arranged within a radially traversed row of blades. In this case the first row of guide blades of the blading may conveniently constitute a part of the cage enclosing the regulating member. The regulating member itself can be constructed as a tubular valve with double seat through the interior of which the driving medium flows before it reaches the principal regulating throttle cross-section.

The figures of the drawings show a vertical section along the middle axis of a steam turbine with a regulating device according to the invention.

Figure 1 shows a section through the two turbine housings of a radially traversed steam turbine which are attached in an overhung manner to a rotary machine (not shown).

Figure 2 is a section on an enlarged scale through the regulating device of the high pressure portion.

In both figures, 1 is the radially traversed high pressure blading of the turbine. The working steam enters this turbine at 2. 3 is the regulating member which effects the regulation of performance by the method according to the invention. This regulating member is constructed as a double-seat valve having seats 4 and 5. It is disposed within the radially traversed blading. The first guide blades 6 form a part of the valve cage. According to this construction, the guide blading 6 is equally adjacent throughout its periphery to the principal regulating cross-section 5. The entering working steam distributes itself from the entry opening 2 via the annular cross-section 7 over the whole extent of the valve 3. It then enters through the openings 8 into the interior of the tubular portion 3 of the valve body. If the valve body 3 moves to the left the throttle cross-sections at the seats 4 and 5 open. Through the seat 4, however, only so much steam can pass as is permitted through the clearance 9 (not visible in Figure 1). This small quantity of steam does not require further consideration; it may however be mentioned that the shoulder on the valve 3 engaging the seat 4 aids in balancing the valve. The steam flowing through the clearance opening at the seat 5 with a higher speed corresponding to the pressure difference flows without change in direction to the immediately adjacent guide blading 6. It is then guided by the guide blading into the desired direction and gives up its energy to the following rotating blades. The steam, therefore, acts during the whole regulating process on the full extent of the blading of the turbine with just the speed which is produced in the regulating cross-section 5. If the regulating valve is moved to the left to its extreme position it permits completely free access to the guide blading 6. The group of blades I which are intended for reaction, however, work at full load entirely with reaction which makes possible the achievement of a full load efficiency which is in no way influenced by the improvement in part load efficiency. In the known regulating methods the full load efficiency is unfavorably influenced by the devices for improving the partial load efficiency.

If the regulating member 3 moves to the right in order to diminish the performance, more and more head is throttled in the narrow cross-section between the regulating member 3 and the seat 5, whereby the speed of flow in this cross-section increases. The steam enters at this high speed into the blading and no longer fills the cross-sections of the first blades in consequence of the diminished quantity of flow and the high speed of flow. The steam, therefore, flows through the first blades just as in a pure velocity staging, until it speed, due to work done and losses, is diminished to such an extent that it once more fills the appropriate later blade cross-sections. From these cross-sections onwards further expansion of the steam takes place within the blading with pressure drop at each blade or row. The row of blades at which the blade cross-section is first filled again is determined by the degree of throttling in the regulating cross-section and the number of pressure drops varies accordingly.

Figure 1 gives moreover a complete picture of the turbine with regulating devices. 10 and 11 are the ends of the shaft of the driven rotary machine (not shown) e. g. a generator. These are journalled in bearings 12 and 13. The shaft ends carry the discs 14 and 15 which support the rotating blades of the blading 1 and 16. The stationary blades are held by the discs 17 and 18. The packing between steam and oil is effected by packings 19 and 20. The steam enters at 2, flows through the regulating member 3, the first row of guide blades 6, and the blading 1. It is then led through the pipe 21 to the second housing in which it traverses the blading 16. Finally after giving up its energy completely it leaves the turbine at 22. The opposite thrusts of the discs 14 and 15 result in a small residual thrust taken up by the thrust bearing 50.

A shaft 24 is connected by means of a bush 23 to the end 11 of the main shaft. The shaft 24 drives by means of the hollow shaft 25 a gear wheel 26 which actuates the oil pump 30 by means of the gear wheels 27, 28, 29 and the governor 32 by means of the bevel wheels 31. The oil pump 30 sucks oil from the container 34 through the pipe 33 and delivers it under pressure to the pipe 35 which, inter alia, feeds the bearings from which the oil returns to the container 34 through the pipes 36 and 37. The oil under pressure also passes from the pipe 35 to the slide valve housing 39 via the pipe 38. The slide valve 40 which is displaced by the lever 42 controlled by the regulating sleeve 41 in correspondence with the speed of revolution of the turbine opens more or less the entry to the pipe 43. This pipe 43 is connected with an adjustable overflow 44. Once the opening of this overflow 44 has been adjusted a quite definite pressure is established in the pipe 43 which varies in accordance with the entry cross-section left free by the slide valve 40. The pressure in the pipe 43 acts through the pipe 45 on the piston 46 and thereby on the spring 47. It, therefore, gives quite a definite position to the piston 46 corresponding to the characteristic of the spring 47. The piston 46 actuates the regulating member 3 by means of the spindles 48 and 49.

The regulation operation is, therefore, such that on increasing the number of revolutions of the turbine the weights 32 of the governor are lifted, the slide valve 40 sinks and cuts off the pressure oil from the channel 43. As the overflow through the opening 44 continues—an adjustment of 44 is only effected when an artificial extra regulation of the number of revolutions is required— the pressure in the pipes 43, 45, falls, the piston 46 is moved to the left by the spring 47, and the throttling member 3 is closed. The opposite takes place when the number of revolutions falls which gives rise to an increase in the oil pressure in the pipes 43, 45 which opens the throttling member 3.

The drawings show only one embodiment of the invention, but the latter is not limited thereto, being capable of many variations from the illustrated structure within the scope of the appended claims.

I claim:

1. In combination in a turbine adapted to be impinged by an elastic fluid, a shaft, a plurality of stages of blade rows on said shaft adapted to cause successive acceleration of the working medium at full load by multiple expansion creating a plurality of pressure drops, and throttling means arranged in advance of some of the stages and operable to impart to the working medium a high velocity at partial load and to direct said medium at said high velocity into one of the turbine stages passing said medium at partial load, thereby producing at partial load a diminished number of pressure drops through the same number of stages as compared with operation at full load.

2. In combination in a turbine adapted to be impinged by an elastic fluid, a shaft, a plurality of stages of blade rows on said shaft arranged successively to each other in such a way that the working medium leaving the one stage enters the next stage substantially without loss of velocity and adapted to cause successive accelerations of the working medium at full load by multiple expansion creating a plurality of pressure drops, and throttling means arranged in advance of some of the stages adapted to impart to the working medium a high velocity at partial load and to direct said medium at said high velocity into one of the turbine stages passing said medium at partial load, thereby producing at partial load a diminished number of pressure drops through the same number of stages as compared with operation at full load.

3. In combination in a turbine adapted to be impinged by an elastic fluid, a shaft, a plurality of stages of blade rows on said shaft adapted to cause successive acceleration of the working medium at full load by multiple expansion creating a plurality of pressure drops, throttling means arranged in advance of some of the stages adapted to impart to the working medium a high velocity at partial load and to direct said medium at said high velocity into one of the turbine stages passing said medium at partial load, thereby producing at partial load a diminished number of pressure drops through the same number of stages as compared with operation at full load, and means for adjusting said throttling means according to the speed of said shaft.

4. Apparatus according to claim 1, wherein said throttling means comprises a stationary edge and a movable valve with a controlling edge, said edges extending along the circumference of one of said blade rows on substantially the same diameter as that on which the entry edges of the blades of such row are arranged.

5. Apparatus according to claim 1, wherein the turbine is of the radial flow type and wherein said throttling means comprises a stationary edge and a movable valve with a controlling edge said edges being arranged inside of the radially disposed blade rows and extending along the circumference of one of said blade rows on substantially the diameter on which the entry edges of the blades are arranged.

6. Apparatus according to claim 1, wherein said throttling means comprises a stationary edge, a movable valve cooperating with said edge and extending along the circumference of one of said blade rows on substantially the diameter on which the entry edges of the blades are arranged, and a cage surrounding said valve of which the first row of blades is a constructional part.

7. Apparatus according to claim 1, wherein said throttling means comprises a movable, hollow valve through which the main part of the working medium passes before being throttled.

8. Apparatus according to claim 1, wherein the turbine is of the radial flow type and wherein said throttling means comprises a movable, hollow valve through which the main part of the working medium passes before being throttled, said valve having two seats, the one seat controlling the main part of the working medium and being arranged inside of said radially disposed stages of blade rows, the other seat allowing for the balancing of the valve.

9. Apparatus according to claim 1, wherein the turbine is of the radial flow type and wherein said throttling means comprises a movable, hollow valve through which the main part of the working medium passes before being throttled, and a cage surrounding said valve of which the first row of blades is a constructional part, one of the valve seats controlling the main part of the working medium and being arranged inside of the radially disposed stages of blade rows, and the other seat allowing for the balancing of the valve.

10. In combination in a turbine adapted to be impinged by an elastic fluid, a shaft with two overhung ends, a plurality of stages of blade rows arranged radially around each other on each end of said shaft and adapted to cause successive accelerations of the working medium at full load by multiple expansion creating a plurality of pressure drops, the bladings being so arranged that the resulting axial thrusts of the stages at the one end are opposed to the axial thrusts of the stages at the other end, and throttling means arranged in advance of some of the stages and operating to impart to the working medium a high velocity at partial load and to direct said medium at said high velocity into one of the turbine stages passing said medium at partial load, thereby producing at partial load a diminished number of pressure drops through the same number of stages as compared with operation at full load.

ULRICH MEININGHAUS.